(12) United States Patent
Schmidt

(10) Patent No.: US 6,805,322 B2
(45) Date of Patent: Oct. 19, 2004

(54) MULTIPLE-POSITION SEAT

(75) Inventor: Gregory M. Schmidt, Seattle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/222,291

(22) Filed: Aug. 15, 2002

(65) Prior Publication Data

US 2004/0031883 A1 Feb. 19, 2004

(51) Int. Cl.$^7$ .............................................. A47C 3/025
(52) U.S. Cl. ............................. 244/122 R; 297/284.11
(58) Field of Search ........................ 244/122 R, 118.5, 244/118.6, 122 AH, 124, 141; 297/1, 13, 16.1, 19, 20, 36, 37, 40, 44, 68, 69, 74, 84, 88, 107, 108, 195.12, 240, 249, 257, 310, 311, 313, 423.1, 423.11, 425.16, 423.15

(56) References Cited

U.S. PATENT DOCUMENTS

| | | | | |
|---|---|---|---|---|
| 869,122 A | * | 10/1907 | Witte | 248/371 |
| 1,240,244 A | * | 9/1917 | Ogle | 297/101 |
| 2,016,119 A | * | 10/1935 | Owler | 297/362 |
| 2,481,970 A | * | 9/1949 | Bell | 297/423.15 |
| 2,561,091 A | * | 7/1951 | Bell | 297/423.15 |
| 2,591,598 A | * | 4/1952 | Owler | 297/423.15 |
| 2,859,803 A | * | 11/1958 | McCallister | 297/245 |
| 2,860,691 A | * | 11/1958 | Caesar | 297/322 |
| 3,375,039 A | * | 3/1968 | Gielow | 297/423.15 |
| 3,556,590 A | * | 1/1971 | Harris | 297/423.15 |
| 3,632,169 A | * | 1/1972 | Barecki et al. | 297/423.15 |
| 3,669,493 A | * | 6/1972 | Vowles | 297/423.11 |
| 3,695,707 A | * | 10/1972 | Barecki et al. | 297/452.55 |
| 3,761,045 A | * | 9/1973 | Sturhan | 248/567 |
| 3,784,147 A | * | 1/1974 | Harder, Jr. | 248/371 |
| 3,788,697 A | * | 1/1974 | Barton et al. | 297/307 |
| 3,856,352 A | * | 12/1974 | Jacobi, Sr. | 297/423.15 |
| 3,902,755 A | * | 9/1975 | Sirot | 297/339 |
| 4,025,020 A | * | 5/1977 | Goff et al. | 248/582 |
| 4,091,740 A | * | 5/1978 | Lie | 105/345 |
| D265,612 S | * | 8/1982 | Gusrud et al. | D6/373 |
| 4,384,741 A | * | 5/1983 | Flum et al. | 297/300.5 |
| D283,858 S | * | 5/1986 | Opsvik | D6/366 |
| 4,589,699 A | * | 5/1986 | Dungan | 297/423.12 |

(List continued on next page.)

OTHER PUBLICATIONS

Chairs—The Partition Company (1 page) http://www.thepartitioncompany.com.au/chairs_partitionco.html [Accessed Mar. 11, 2002].

Stokke Products (3 pages) http://www.stokke.com/Products.asp?1a=1&n=Duo [Accessed Jun. 12, 2002].

Primary Examiner—Charles T. Jordan
Assistant Examiner—Stephen A Holzen
(74) Attorney, Agent, or Firm—Perkins Coie LLP

(57) ABSTRACT

Multiple-position seating units, methods for operating seating units, and methods for installing seating units are disclosed herein. In one embodiment, the seating unit includes a first seat portion and a second seat portion. The first seat portion has a first upper surface with a front extremity. The first seat portion can be moveable between first and second positions. In the second position, the first seat portion is tilted forwardly downwardly. The second seat portion has a second upper surface that can be configured to support at least one shin of a person. The second seat portion can be moveable between a stowed position and a deployed position. In the deployed position, the second upper surface is spaced apart from the front extremity of the first seat portion.

64 Claims, 6 Drawing Sheets

U.S. PATENT DOCUMENTS

| | | | | |
|---|---|---|---|---|
| 4,650,249 A | * | 3/1987 | Serber | 297/313 |
| 4,715,654 A | * | 12/1987 | Laskowitz | 297/329 |
| 4,793,655 A | * | 12/1988 | Kvalheim et al. | 297/423.13 |
| 4,848,841 A | * | 7/1989 | Giselsson | 297/423.13 |
| 4,911,381 A | * | 3/1990 | Cannon et al. | 244/122 R |
| 4,913,487 A | * | 4/1990 | Breckel et al. | 297/14 |
| 4,960,305 A | * | 10/1990 | Opsvik | 297/423.12 |
| 5,064,146 A | * | 11/1991 | Tung | 244/122 R |
| 5,108,148 A | * | 4/1992 | Henke | 297/81 |
| 5,251,961 A | * | 10/1993 | Pass | 297/423.1 |
| 5,255,957 A | * | 10/1993 | Opsvik et al. | 297/423.12 |
| 5,333,818 A | * | 8/1994 | Brandt et al. | 244/118.6 |
| 5,352,013 A | * | 10/1994 | Rusyniak | 297/119 |
| 5,374,102 A | * | 12/1994 | Archambault et al. | 297/344.13 |
| 5,409,186 A | * | 4/1995 | Chow | 244/122 R |
| D369,691 S | * | 5/1996 | Haynes | D6/367 |
| 5,630,644 A | * | 5/1997 | LaPointe et al. | 297/232 |
| 5,667,278 A | * | 9/1997 | Li | 297/423.13 |
| 5,788,183 A | * | 8/1998 | Marechal | 244/118.6 |
| 5,857,747 A | * | 1/1999 | Mundkowski | 297/423.11 |
| 6,059,367 A | * | 5/2000 | Rogers | 297/423.1 |
| 6,161,663 A | * | 12/2000 | Venetta et al. | 188/300 |
| 6,173,921 B1 | * | 1/2001 | Neumann et al. | 244/118.6 |
| 6,412,870 B1 | * | 7/2002 | Higgins et al. | 297/342 |
| 6,431,649 B1 | * | 8/2002 | Hensel | 297/300.2 |
| 6,439,636 B1 | * | 8/2002 | Kuo | 296/65.09 |
| 6,450,449 B1 | * | 9/2002 | Podob et al. | 244/122 R |
| 6,494,536 B2 | * | 12/2002 | Plant | 297/284.11 |
| 6,513,756 B1 | * | 2/2003 | Lambiaso | 244/119 |
| 6,588,839 B1 | * | 7/2003 | Salzer | 297/217.1 |
| 2001/0015566 A1 | * | 8/2001 | Park et al. | 297/115 |
| 2001/0040402 A1 | * | 11/2001 | Odderson | 297/452.21 |
| 2002/0033622 A1 | * | 3/2002 | Jarnail et al. | 297/216.2 |
| 2003/0071502 A1 | * | 4/2003 | Marshall et al. | 297/302.1 |
| 2003/0075966 A1 | * | 4/2003 | Behnert | 297/423.26 |
| 2003/0080597 A1 | * | 5/2003 | Beroth et al. | 297/330 |

* cited by examiner

MULTIPLE-POSITION SEAT

TECHNICAL FIELD

The present invention is directed toward multiple-position seating units, methods for operating seating units, and methods for installing seating units.

BACKGROUND

Vehicles such as airplanes, trains, boats, and buses typically have passenger cabins that include seats or seating units arranged in rows. In airplanes, for example, the rows can include one to five seats. Within the passenger cabins, seats are typically spaced close together in order to maximize the vehicle's passenger capacity. During a trip passengers are generally permitted to leave their seats and move about the passenger cabin, for example, to stretch or use the restroom. Once a passenger leaves the seat, however, the passenger is no longer afforded the protection of a seat belt. Consequently, passengers are often encouraged to spend the vast majority of the trip in their seats.

Since passengers spend the majority of their trips seated, it is desirable to provide safe and comfortable seats. Conventional vehicle seats typically fail to provide the desired level of comfort to passengers. For example, conventional seats have very limited mobility-the seats only move between upright and reclined configurations. Accordingly, the passenger's options are limited. The lack of mobility in conventional seats limits the passenger's ability to sit in different positions during a trip. Furthermore, the passenger often feels crowded by other passengers seated in adjacent seats because the seats are typically spaced quite close to each other.

SUMMARY

The present invention is directed toward multiple-position seating units, methods for operating seating units, and methods for installing seating units. In one aspect of the invention, the seating unit includes a first seat portion and a second seat portion. The first seat portion has a first upper surface with a front extremity and a rear extremity. The first seat portion is moveable between a first position and a second position. In the second position, the first seat portion tilts forwardly downwardly. The second seat portion has a second upper surface and is moveable between a stowed position and a deployed position. When the second seat portion is in the deployed position, the second upper surface is spaced apart from the front extremity of the first seat portion.

In a further aspect of the invention, the seating unit can also include a backrest positioned proximate to the first seat portion. In another aspect of the invention, the seating unit can include a base frame configured for attachment to a floor of the vehicle, and the base frame can include a support arm. In this aspect of the invention, the first seat portion can be coupled to the base frame, and the second seat portion can be coupled to the support arm. In an additional aspect of the invention, the second seat portion can be configured to support at least one shin of a person seated behind the seating unit when the second seat portion is in the deployed position.

In another aspect of the invention, the seating unit includes a track configured for attachment to a floor, a first seat portion coupleable to the floor, and a second seat portion coupleable to the track. The first seat portion has a first upper surface with a front extremity and a rear extremity. The first seat portion is moveable between a first position and a second position. In the second position, the first seat portion tilts forwardly downwardly. The second seat portion has a second upper surface configured to support at least one shin of a person. The second seat portion is moveable between a stowed position and a deployed position. When the second seat portion is in the deployed position, the second upper surface is spaced apart from the front extremity of the first seat portion.

In a further aspect of the invention, a vehicle includes a floor and a plurality of seating units coupled to the floor. At least one of the seating units includes a first seat portion coupled to the floor and a second seat portion spaced apart from the first seat portion. The first seat portion has an upper surface with a first front extremity and the first seat portion tilts forwardly downwardly. The second seat portion has a second upper surface configured to support at least one shin of a person. The second upper surface is spaced apart from the front extremity, and the second seat portion is tilted forwardly upwardly.

In an additional aspect of the invention, a method for operating a vehicle seating unit includes sitting upright in the seating unit, wherein the seating unit has a first seat portion and a second seat portion. The method further includes moving the first seat portion from a first position to a second position. When the first seat portion is in the second position, a front extremity of the first seat portion is lower than a rear extremity of the first seat portion. The method further includes deploying the second seat portion, and kneeling on the second seat portion while at the same time sitting on the first seat portion.

In another aspect of the invention, a method for installing a seating unit on an aircraft includes coupling to the aircraft a first seat portion moveable between a first position and a second position. When the first seat portion is in the second position, a front extremity of the first seat portion is lower than a rear extremity. The method further includes positioning a second seat portion proximate to the first seat portion. The second seat portion has an upper surface that is configured to support at least one shin of a person. The upper surface is also spaced apart from the front extremity of the first seat portion when the second seat portion is in a deployed position.

DETAILED DESCRIPTION

The present disclosure describes multiple-position seating units, methods for operating seating units, and methods for installing seating units. Many specific details of several embodiments of the invention are set forth in the following description and in FIGS. 1–8 to provide a thorough understanding of such embodiments. Those of ordinary skill in the art, however, will understand that the invention can have additional embodiments, and that the invention may be practiced without several of the details described below.

Figure 1:
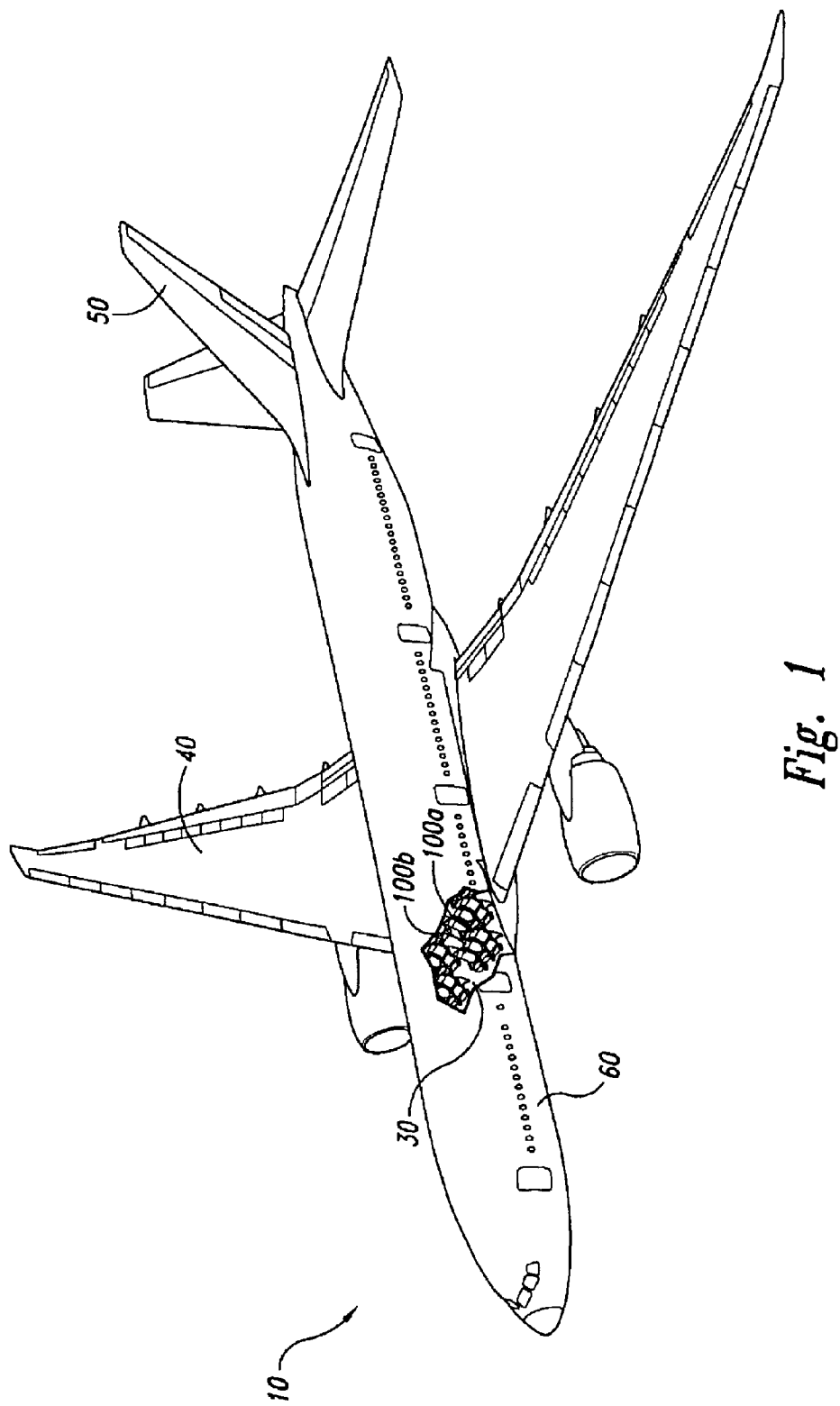
FIG. 1 is a front isometric view of a vehicle, such as an aircraft, having seating units in accordance with one embodiment of the invention.

FIG. 1 is a front isometric view of a vehicle, such as an aircraft 10, having a plurality of seating units 100 (two of which are shown in FIG. 1 as units 100a and 100b) in accordance with one embodiment of the invention. The aircraft 10 includes a fuselage 60, wings 40 attached to the fuselage 60, and a tail 50 also attached to the fuselage 60. The fuselage 60 includes at least one cabin 30 configured to carry passengers and/or freight. In some aircraft 10 configurations, the cabin 30 can be divided into one or more passenger cabin portions, such as a first class cabin portion and an economy class cabin portion. Typically, each cabin or cabin portion includes rows of seating units 100 divided by one or more aisles. Often the seating units 100 in one row are positioned directly behind other seating units 100 in the preceding row.

Figure 2:
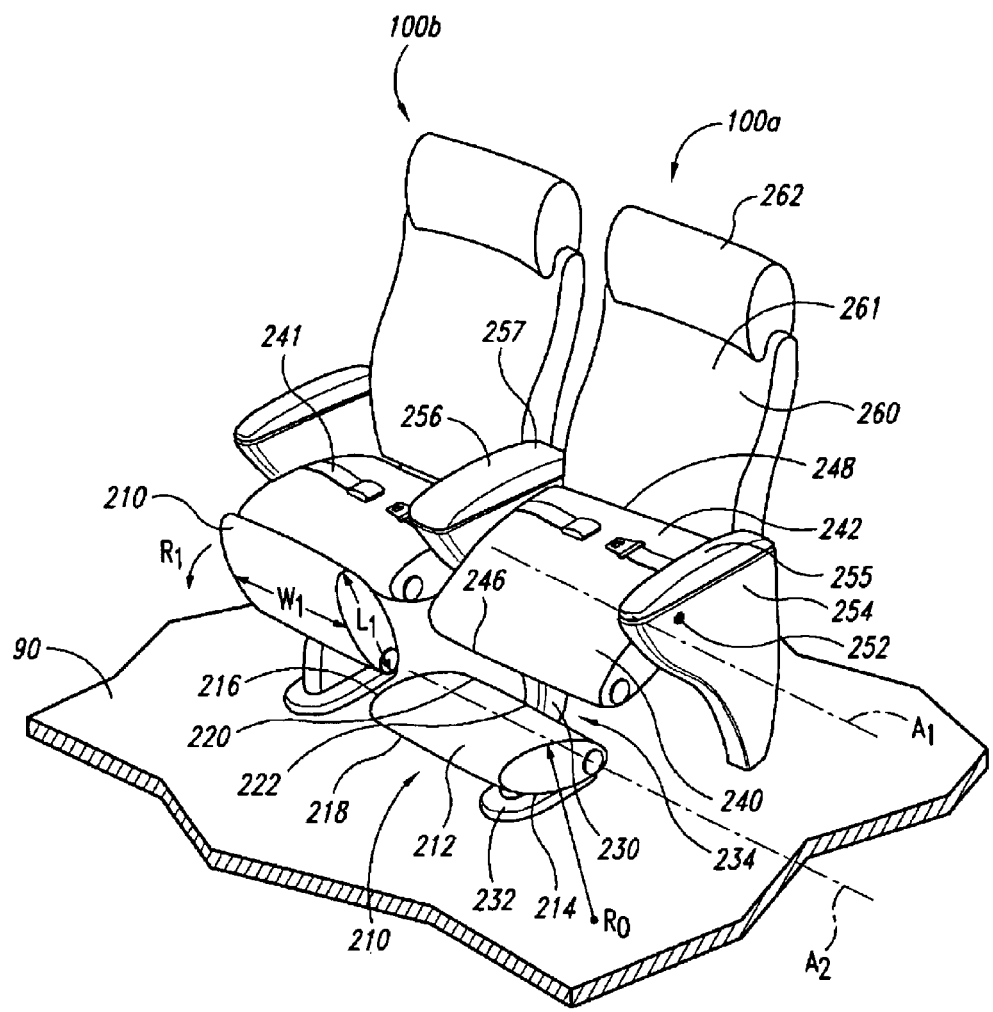
FIG. 2 is a front isometric view of two of the seating units of FIG. 1.
Figure 3:
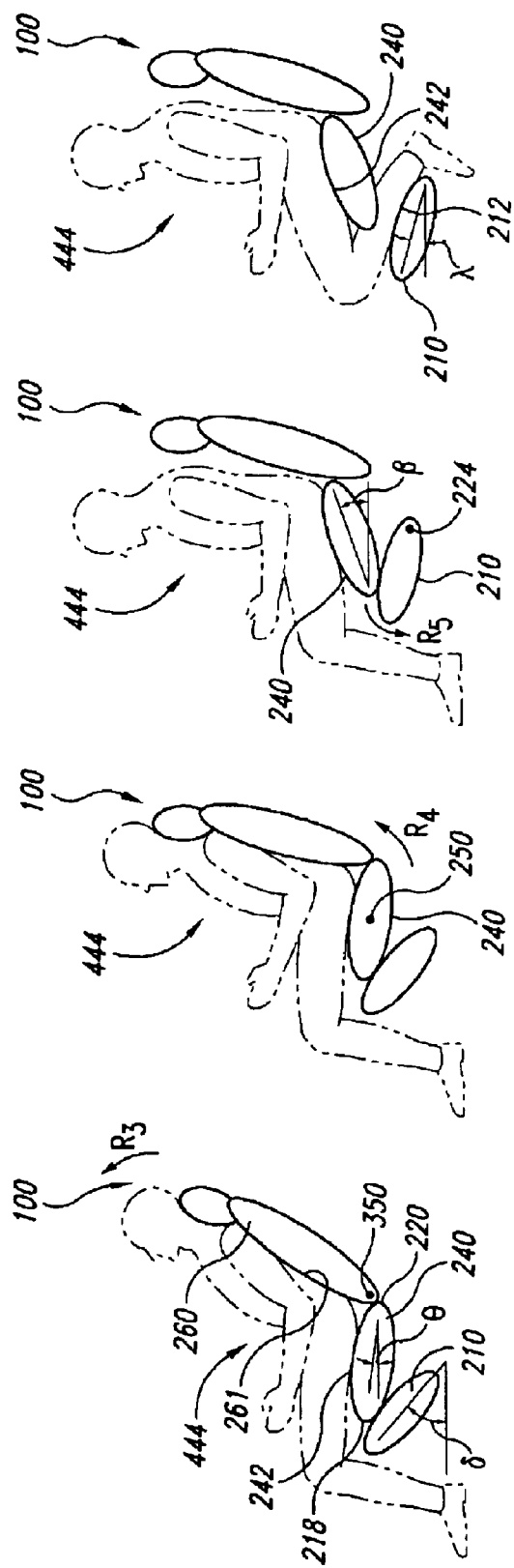
FIG. 3A is a side schematic view of a passenger in a reclined position in the seating unit of FIG. 1.
FIG. 3B is a side schematic view of the passenger in an upright position in the seating unit of FIG. 1.
FIG. 3C is a side schematic view of the passenger in a transitional position in the seating unit of FIG. 1.
FIG. 3D is a side schematic view of the passenger in a kneeling position in the seating unit of FIG. 1.

FIG. 2 is a front isometric view of the seating units 100 shown in FIG. 1. The seating units 100 are configured to support passengers (not shown in FIG. 2) safely and comfortably throughout a trip. Each seating unit 100 can include a first seat portion 240, a second seat portion 210, a first armrest 254, and a second armrest 256. The first seat portion 240 can include a front extremity 246 such as a front edge, a rear extremity 248 such as a rear edge, and a first surface 242 disposed between the front extremity 246 and the rear extremity 248. In one embodiment, the first seat portion 240 is rotatably coupled to the first and second armrests 254 and 256 and pivots about an axis of rotation $A_1$ between a first position (illustrated by seating unit 100b) and a second position (illustrated by seating unit 100a). In one embodiment, the front extremity 246 can be higher than the rear extremity 248 (relative to a floor 90) when the first seat portion 240 is in the first position. In other embodiments, the first surface 242 can be generally horizontal, or the front extremity 246 can be lower than the rear extremity 248 when the first seat portion 240 is in the first position. In any of these embodiments, the first surface 242 slopes downwardly toward the front extremity 246 when the first seat portion 240 is in the second position. In one embodiment, a seat belt 241 can be attached to and move with the first seat portion 240.

The first armrest 254 can include a first surface 255 configured to support one arm of a passenger, and the second armrest 256 can include a first surface 257 configured to support the other arm of the passenger. In one embodiment, the first surface 257 of the second armrest 256 can have a larger surface area than the first surface 255 of the first armrest 254 so that the second armrest 256 can accommodate the arms of passengers seated simultaneously in each of the seating units 100a, 100b. In one embodiment, the first and second armrests 254 and 256 are configured to be coupled to the floor 90 of the vehicle. In other embodiments, the seating units 100 may not include armrests 254 and 256, but may have a frame or other structure that is attached to the floor and that movably supports the first seat portion 240.

The second seat portion 210 can be positioned adjacent to the first seat portion 240 and can function as a knee/shin support or a footrest. In one embodiment, the second seat portion 210 has a front extremity 218 such as a front edge, a rear extremity 220 such as a rear edge, a first surface 212 disposed between the front and rear extremities 218 and 220, a first end 214, and a second end 216 opposite the first end 214. The first surface 212 can be sized and configured to receive and support the shins of the passenger. In one embodiment, the second seat portion 210 has a width $W_1$ extending from the first end 214 to the second end 216, and a length $L_1$ extending from the front extremity 218 to the rear extremity 220. The width $W_1$ and length $L_1$ are sized to permit the passenger to place both knees and/or shins in a comfortable position on the first surface 212. In one aspect of this embodiment, the first surface 212 has a radius of curvature $R_0$, and in other embodiments, the first surface 212 can have other configurations, such as being flat.

In any of the foregoing embodiments, the second seat portion 210 can be rotatable about an axis of rotation $A_2$ between a stowed position (illustrated by seating unit 100b) and a deployed position (illustrated by seating unit 100a). In one embodiment, the front extremity 218 of the second seat portion 210 is positioned proximate to the front extremity 246 of the first seat portion 240 when the second seat portion 210 is in the stowed position. In other embodiments, such as those described below with reference to FIGS. 6, 7, and 8, the second seat portion 210 can be stowed in different positions. From the stowed position, the second seat portion 210 can be rotated in a direction $R_1$ about the axis of rotation $A_2$ to the deployed position. When the second seat portion 210 is in the deployed position, the first surface 212 is spaced apart from the front extremity 246 of the first seat portion 240 so that the passenger's leg can fit between the first seat portion 240 and the second seat portion 210. In additional embodiments, the first and second portions 240 and 210 can be part of an integral unit with cutouts to fit a person's legs.

Each seating unit 100 can also include a frame 234 having a base 232 configured for attachment to the floor 90 of the vehicle, and a support arm 230 that supports the second seat portion 210 for rotation relative to the first seat portion 240. The support arm 230 can be coupled to the second seat portion 210 proximate to a middle portion 222 of the second seat portion 210, such that the support arm 230 does not interfere with the position of the passenger's legs. More specifically, the support arm 230 can be positioned such that the passenger can place a leg on each side of the support arm 230.

In one embodiment, the seating unit 100 includes a backrest 260. The backrest 260 can have a first surface 261 configured and positioned to support the passenger's back and, optionally, a headrest 262 to support the passenger's head. In one embodiment, the backrest 260 can be pivotably coupled to the first and second armrests 254 and 256 such that the backrest 260 pivots between a reclined position and an upright position. In other embodiments, (for example, when the seating unit 100 does not have the armrests 254 and 256) the backrest 260 can be pivotally coupled to the frame or other portions of the seating unit 100. In other embodiments, the backrest 260 can have non-pivoting, movable arrangements, or the backrest 260 can be fixed relative to the rest of the seating unit 100. In still further embodiments, the backrest 260 can be eliminated.

The backrest 260, the first seat portion 240, and the second seat portion 210 can each be moved manually or by a motor, such as an electrical motor. For example, in one embodiment, the first seat portion 240 can be rotated from the first position to the second position by manually exerting a downward force on the first surface 242 proximate to the front extremity 246. In another embodiment, the first seat portion 240 can include a spring-loaded system that rotates the first seat portion 240 from the second position to the first position. In another aspect of these embodiments, the backrest 260, the first seat portion 240, and the second seat portion 210 can each be locked into a particular position by a detent, an electrical or mechanical lock, or other securing devices. For example, the second seat portion 210 can include a mechanical lock to secure it in the deployed position. A release, such as a release button 252 located on the seating unit 100, such as on the armrest 254, can release the lock so that the second seat portion 210 can rotate.

FIGS. 3A–3D are side schematic views of a passenger 444 seated in the seating unit 100 in reclined, upright, transitional, and kneeling configurations, respectively. Beginning with FIG. 3A, when the seating unit 100 is in the reclined configuration, the passenger 444 is seated on the first surface 242 of the first seat portion 240, and the passenger's back rests against the first surface 261 of the backrest 260. The first seat portion 240 is oriented at an angle θ with respect to horizontal when in the first position. In one embodiment, the angle θ can be from about 0 to about 15 degrees, and in a further aspect of this embodiment the angle θ can be about 7 degrees. In other embodiments, the angle θ can be less than 0 degrees or more than 15 degrees. The second seat portion 210 (when in the stowed position), is oriented at an angle δ relative to horizontal. In one embodiment, the angle δ can be from about 60 degrees to about 70 degrees, and in a further aspect of this embodiment, the angle δ can be about 64 degrees. In other embodiments, the angle δ can be less than 60 degrees or more than 70 degrees. In one embodiment, the backrest 260 rotates about a pivot point 350 in a direction $R_3$ while the first and second seat portions 240 and 210 remain stationary as the seating unit 100 is moved from the reclined configuration to the upright configuration.

FIG. 3B illustrates the seating unit 100 in the upright configuration. To move the seating unit 100 from the upright configuration to the kneeling configuration, the first seat portion 240 is rotated in a direction $R_4$ about a pivot point 250 from the first position to the second position. FIG. 3C illustrates the seating unit 100 in the transitional configuration between the upright configuration and the kneeling configuration. When the seating unit 100 is in the transitional configuration, the first seat portion 240 is positioned at an angle β relative to horizontal. In one embodiment, the angle β is from about 15 to about 25 degrees, and in a further aspect of this embodiment, the angle β can be about 20 degrees. In other embodiments, the angle β can be greater than 25 degrees or less than 15 degrees.

As the passenger 444 continues to move the seating unit 100 toward the kneeling configuration, the second seat portion 210 rotates in a direction $R_5$ about a pivot point 224 to the deployed position. In other embodiments, the second seat portion 210 can rotate from the stowed position to the deployed position before the first seat portion 240 rotates from the first position to the second position. In any of these embodiments, the passenger 444 can remain in the seating unit 100 as it changes configuration, or the passenger 444 can stand near the seating unit 100 as it changes configuration.

FIG. 3D illustrates the passenger 444 seated in the seating unit 100 with the seating unit 100 in the kneeling configuration. When the seating unit 100 is in the kneeling configuration, the passenger's shins rest against the first surface 212 of the second seat portion 210, while at the same time the passenger 444 is seated on the first surface 242 of the first seat portion 240. The second seat portion 210 is positioned at an angle λ relative to horizontal. In one embodiment, the angle λ is from about 15 to about 25 degrees, and in a further aspect of this embodiment, the angle λ is about 20 degrees. In other embodiments, the angle λ can be less than 15 degrees or greater than 25 degrees.

The components of the seating unit 100 can be moved independently of one another to provide a variety of additional seat configurations. For example, the backrest 260 can be reclined (e.g., as shown in FIG. 3A) when the passenger 444 is kneeling. In other embodiments, the second seat portion 210 can be deployed (e.g., as shown in FIG. 3D) when the passenger 444 is reclining or sitting upright. Accordingly, when the passenger 444 is not kneeling on the second seat portion 210, the second seat portion 210 can function as a footrest for one or both of the passenger's feet. In yet additional embodiments, the seating unit 100 can be fixed in the kneeling configuration. For example, the first seat portion 240 can be fixed in the second position, and the second seat portion 210 can be fixed in the deployed position.

One feature of an embodiment of the seating unit 100 is that it has increased seat mobility, compared with existing units. Accordingly, the passenger may choose between multiple seating configurations depending upon his or her preference at any given time during a trip. An advantage of this feature is that it increases passenger mobility, and consequently, passenger comfort. A further advantage is that the availability of multiple seating positions (and in particular, the kneeling position) can increase the passenger's perceived personal space, further enhancing passenger comfort.

Figure 4:
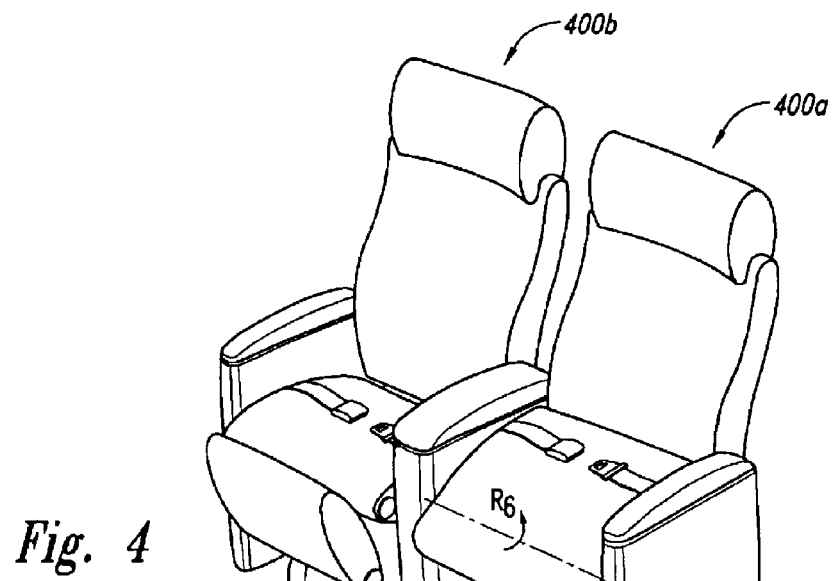
FIG. 4 is a front isometric view of two seating units in accordance with another embodiment of the invention.

FIG. 4 is a front isometric view of two seating units 400 (shown as seating units 400a and 400b) with an axis of rotation $A_3$ positioned toward the front of the first seat portion 240 in accordance with another embodiment of the invention. Accordingly, the first seat portion 240 can rotate in a direction $R_6$ about the axis of rotation $A_3$ from the first position (illustrated by the seating unit 400b) to the second position (illustrated by the seating unit 400a). In other embodiments, the axis of rotation $A_3$ can have other relative positions. In any of these embodiments, the axis of rotation $A_2$ of the second seat portion 210 can also have different positions.

Figure 5:
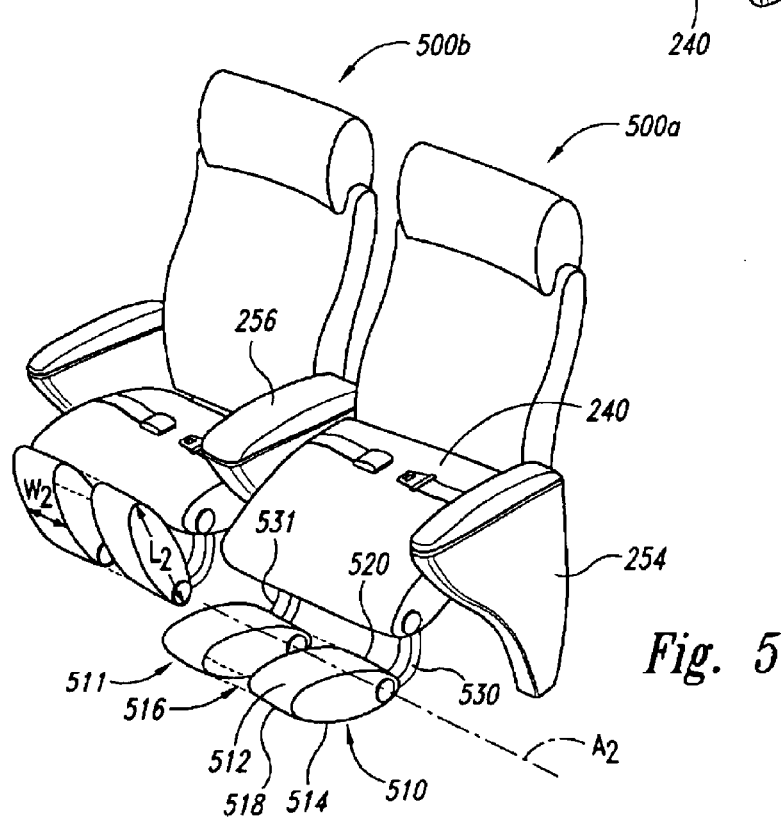
FIG. 5 is a front isometric view of two seating units in accordance with still another embodiment of the invention.

FIG. 5 is a front isometric view of two seating units 500 (shown as seating units 500a and 500b) that each include the first seat portion 240, a second seat portion 510, and a third seat portion 511 in accordance with another embodiment of the invention. In one aspect of this embodiment, the second seat portion 510 can be generally similar to the third seat portion 511 and can be separated from the third seat portion 511 by a gap 516. The second and third seat portions 510 and 511 can each include front extremities 518, rear extremities 520, first surfaces 512 extending from the front extremities 518 to the rear extremities 520, and ends 514. The first surfaces 512 are each positioned and configured to receive and support one of the passenger's shins (not shown in FIG. 5). For example, each of the second and third seat portions 510 and 511 can have a width $W_2$ and the length $L_2$ sized to support comfortably one of the passenger's shins.

In another aspect of this embodiment, each seating unit 500 can include a first support arm 530 and a second support arm 531 rotatably coupled to the second seat portion 510 and the third seat portion 511, respectively. For example, the first support arm 530 can be rotatably coupled to the second seat portion 510 proximate to the first end 514 (i.e., outwardly from the gap 516) so that the first support arm 530 does not interfere with the passenger's leg as the passenger moves to the kneeling position and places the leg between the second seat portion 510 and the first seat portion 240. The second and third seat portions 510 and 511 can be independently rotatable about the axis of rotation $A_2$ between the stowed position (illustrated by the seating unit 500b) and the deployed position (illustrated by the seating unit 500a). In another embodiment, the second seat portion 510 and the third seat portion 511 can be combined into a single unit (as illustrated in phantom lines) and can be rotatably coupled to the seating unit 500 by the first and second support arms 530 and 531. In yet another embodiment, the first and second support arms 530 and 531 can each include a support that extends downwardly and attaches to the floor 90 (not shown in FIG. 5) or to the armrests 254 and 256 to provide additional support for the seating unit 500.

Figure 6:
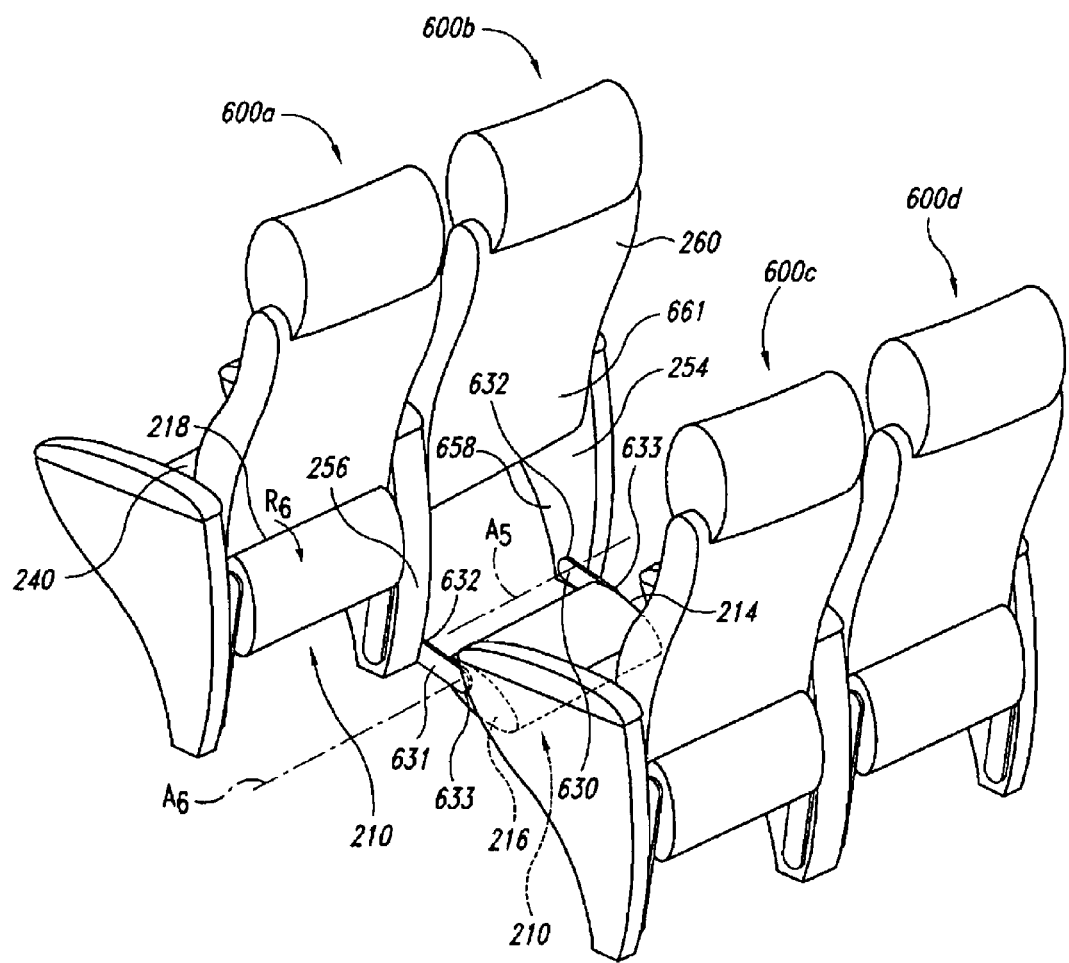
FIG. 6 is a rear isometric view of four seating units in accordance with yet another embodiment of the invention.

FIG. 6 is a rear isometric view of four seating units 600 (shown as forward seating units 600a and 600b, and aft seating units 600c and 600d) with second seat portions 210 deployable from the backs of the seating units 600 in accordance with another embodiment of the invention. Each seating unit 600 includes a first seat portion 240, a second seat portion 210, armrests 254 and 256, a first support arm 630, and a second support arm 631. The first and second support arms 630 and 631 each include a first end 632 and a second end 633 opposite the first end 632. The first ends 632 of the support arms 630 and 631 are rotatably coupled to the armrests 254 and 256, respectively, proximate to an inwardly facing side 658 on each armrest 254, 256. The second ends 633 of the support arms 630 and 631 are rotatably coupled to the first and second ends 214 and 216, respectively, of the second seat portion 210. Accordingly, the second seat portion 210 can be rotatably coupled to the armrests 254 and 256.

The second seat portion 210 is movable between a stowed position (illustrated by seating unit 600a), and a deployed position (illustrated by seating unit 600b). When the second seat portion 210 is in the stowed position, the front extremity 218 is positioned proximate to a second surface 661 of the backrest 260. To move from the stowed position to the deployed position, the support arms 630 and 631 rotate in a direction $R_6$ about a rotation axis $A_5$. The second seat portion 210 can then rotate about a rotation axis $A_6$. When in the deployed position, the second seat portion 210 is positioned to support the shins or feet of a passenger seated in the aft seating unit 600c directly behind the seating unit 600a. In other embodiments, the second seat portion 210 can be coupled to the seating unit 100 in other manners. For example, the second seat portion can be slidably coupled to the armrests 254 and 256 to slide along a track from the stowed position to the deployed position.

Figure 7:
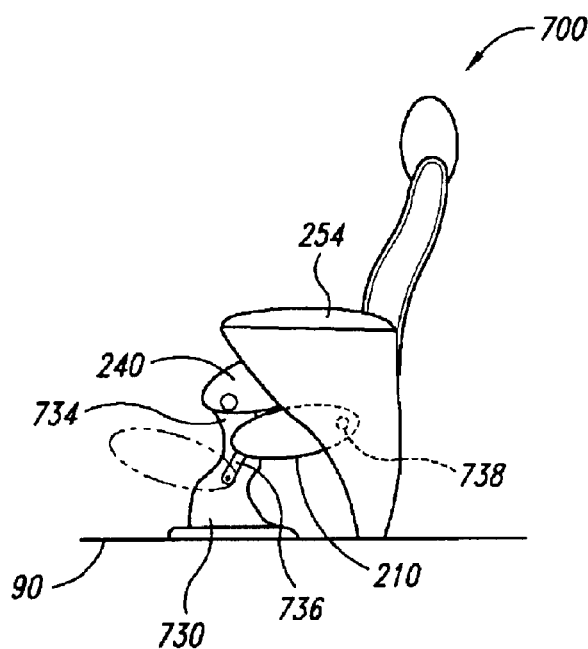
FIG. 7 is a side schematic view of a seating unit in accordance with still another embodiment of the invention.

FIG. 7 is a schematic side view of a seating unit 700 including a second seat portion 210 that slides in accordance with another embodiment of the invention. The seating unit 700 includes a first seat portion 240, a second seat portion 210, and a frame 734. The first seat portion 240 can be rotatably coupled to the frame 734 to pivot between the first position and the second position. In one aspect of this embodiment, the frame 734 includes a single support arm 730 attached to the floor 90, and a slot 736 extending along a portion of the frame 734. In a further aspect of this embodiment, the support arm 730 can be laterally aligned proximate to the armrest 256 (not shown in FIG. 7) to avoid interference with the passenger's legs. In other embodiments, the seating unit 700 can include two support arms, one proximate to each armrest 254 and 256. In any of these embodiments, the second seat portion 210 can include a peg 738 receivable within and slidable along the slot 736. Accordingly, the second seat portion 210 can slide and/or rotate between a stowed position (shown in solid and hidden lines) and a deployed position (shown in phantom lines).

Figure 8:
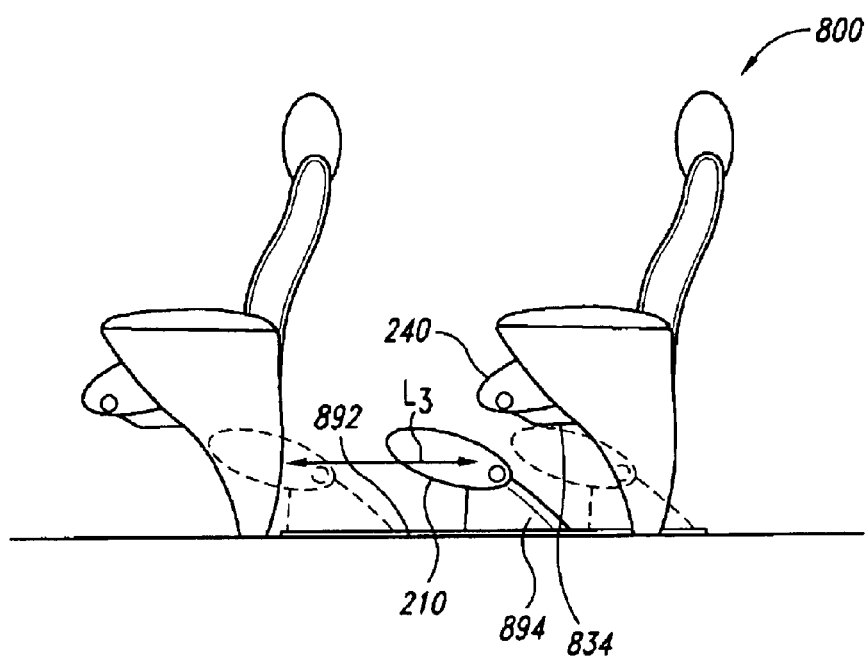
FIG. 8 is a side schematic view of two seating units in accordance with yet another embodiment of the invention.

FIG. 8 is a schematic side view of a seating unit 800 that includes a track 892 and a support 894 coupled to the track 892 in accordance with another embodiment of the invention. The seating unit 800 also includes a frame 834, a first seat portion 240 supported by the frame 834, and a second seat portion 210 supported by the support 894. The support 894 is slidable along the track 892 in a direction $L_3$ SO that the second seat portion 210 can be moved by the passenger from a deployed position (shown in solid lines) to one or more stowed positions (shown in hidden lines). In one stowed position, the second seat portion 210 can be positioned below the first seat portion 240. In another stowed position, the second seat portion 210 can be moved forward, away from the seating unit 800. In one embodiment, the second seat portion 210 can be rotatably coupled to the support 894. In other embodiments, the second seat portion 210 can move in other manners relative to the first seat portion 240, or can be fixed relative to the first seat portion 240. In additional embodiments, the seating unit 800 can include two supports coupled to the second seat portion 210.

From the foregoing, it will be appreciated that specific embodiments of the invention have been described herein for purposes of illustration, but that various modifications may be made without deviating from the spirit and scope of the invention. For example, seating units generally similar to those described above can be installed singly (e.g., for a single operator or passenger) or in groups in vehicles other than aircraft, such as buses, trains or boats. Furthermore, the seating units can be used independent of vehicles. Accordingly, the invention is not limited except as by the appended claims.

I claim:

1. A seating unit, comprising:
    a first seat portion having a first upper surface with a front extremity and a rear extremity, the first seat portion being moveable between a first position and a second position, wherein the first seat portion is tilted forwardly upwardly when in the first position, and wherein the first seat portion is tilted forwardly downwardly when in the second position; and
    a second seat portion having a second upper surface, the second seat portion being moveable between a stowed position and a deployed position, wherein the second upper surface of the second seat portion is spaced apart from the front extremity of the first seat portion so as to receive a leg between the second upper surface and the front extremity when the second seat portion is in the deployed position.

2. The seating unit of claim 1, further comprising a base frame including at least one support arm coupled to the second seat portion.

3. The seating unit of claim 1, further comprising a backrest moveable between a reclined position and an upright position.

4. The seating unit of claim 1, further comprising a track slidably coupleable to the second seat portion, wherein the second seat portion is slidable between the stowed position and the deployed position.

5. A The seating unit of claim 1 wherein the first seat portion includes a bottom surface opposite the first upper surface, and wherein the second seat portion is positioned proximate to the bottom surface of the first seat portion when the second seat portion is in the stowed position.

6. The seating unit of claim 1 wherein the second seat portion is sized and configured to support both shins of the person.

7. The seating unit of claim 1 wherein the second seat portion is configured to support one of the shins of the person, and wherein the seating unit further comprises a third seat portion having a third upper surface configured to support the other shin of the person, at least a portion of the third seat portion being spaced apart from the second seat portion, the third seat portion being moveable between a deployed position and a stowed position, wherein the third upper surface is spaced apart from the front extremity of the first seat portion when the third seat portion is in the deployed position.

8. The seating unit of claim 1 wherein the second seat portion is moveable independent of the first seat portion.

9. The seating unit of claim 1, further comprising a seat belt coupled to the first seat portion, wherein the seat belt moves with the first seat portion as the first seat portion moves between the first and second positions.

10. The seating unit of claim 1, further comprising at least one armrest, wherein the first seat portion is pivotally attached to the at Feast one armrest proximate to the front extremity of the first seat portion.

11. The seating unit of claim 1, further comprising at least one armrest, wherein the first seat portion is pivotally attached to the at least one armrest proximate to the rear extremity of the first seat portion.

12. The seating unit of claim 1, further comprising at least one armrest, wherein the first seat portion is pivotally attached to the at least one armrest proximate to a midpoint between the front extremity and the rear extremity of the first seat portion.

13. The seating unit of claim 1 wherein the second seat portion is configured to support at least one shin of a person.

14. The seating unit of claim 1 wherein the second seat portion is tilted forwardly upwardly when in the deployed position.

15. A seating unit for use in a vehicle having a floor, the seating unit comprising:
a base frame configured for attachment to the floor of the vehicle, the base frame including at least one support arm;
a first seat portion coupled to the base frame, the first seat portion having a first upper surface with a front extremity and a rear extremity, the first seat portion being moveable between a first position and a second position, wherein the front extremity is higher than the rear extremity when the first seat portion is in the first position, and wherein the front extremity is lower than the rear extremity when the first seat portion is in the second position; and
a second seat portion coupled to the at least one support arm, the second seat portion having a second upper surface and being moveable between a stowed position and a deployed position, wherein the second upper surface of the second seat portion is tilted forwardly upwardly and spaced apart from the front extremity of the first seat portion so as to receive a person's leg between the second upper surface and the front extremity when the second seat portion is in the deployed position.

16. The seating unit of claim 15, further comprising a backrest coupled to the base frame.

17. The seating unit of claim 15 wherein the second seat portion is pivotably coupled to the at least one arm, and wherein the second seat portion rotates from the stowed position to the deployed position.

18. The seating unit of claim 15 wherein the second seat portion is slidably coupled to the at least one support arm, wherein the second seat portion slides from the stowed position to the deployed position.

19. The seating unit of claim 15 wherein the second seat portion includes a first end and a second end opposite the first end, and wherein the at least one support arm includes a first support arm coupled at least proximate to the first end, and a second support arm coupled at least proximate to the second end.

20. The seating unit of claim 15, further comprising a backrest coupled to the base frame, wherein the backrest is moveable between a reclined position and an upright position, and wherein the first upper surface of the first seat portion is generally transverse to the backrest when the backrest is in the upright position.

21. The seating unit of claim 15 wherein the first seat portion includes a bottom surface opposite the first upper surface, and wherein the second seat portion is positioned proximate to the bottom surface when the second seat portion is in the stowed position.

22. The seating unit of claim 15 wherein the second seat portion is sized and configured to support both shins of a person.

23. The seating unit of claim 15 wherein the second seat portion is configured to support one of the shins of a person, and wherein the seating unit further comprises a third seat portion coupled to the at least one support arm, the third seat portion having a third upper surface configured to support the other shin of the person, the third seat portion being spaced apart from the second seat portion and the third seat portion being moveable between a deployed position and a stowed position, wherein the third upper surface is spaced apart from the front extremity of the first seat portion when the third seat portion is in the deployed position.

24. A seating unit for use in a vehicle, comprising:
a first seat portion configured to be coupled to the vehicle, the first seat portion having an upper surface with a front extremity and a rear extremity, the first seat portion being moveable between a first position and a second position, wherein the first seat portion is tilted forwardly downwardly when in the second position; and
a second seat portion moveable between a stowed position and a deployed position, the second seat portion being positioned proximate to the rear extremity of the first seat portion when in the stowed position, wherein the second seat portion is sufficiently spaced apart from the first seat portion so as to be positioned to support and contact at least one shin of a person seated in a kneeling position behind the seating unit when the second seat portion is in the deployed position.

25. The seating unit of claim 24, further comprising a backrest positioned at least proximate to the first seat portion.

26. The seating unit of claim 24 wherein the second seat portion is sized and configured to support both shins of the person.

27. The seating unit of claim 24 wherein the first seat portion is generally horizontal when in the first position.

28. The seating unit of claim 24 wherein the second seat portion is configured to support one shin of the person, and wherein the seating unit further comprises a third seat portion spaced apart from the second seat portion, the third seat portion having a third upper surface and being moveable between a deployed position and a stowed position, the third seat portion being positioned proximate to the rear extremity of the first seat portion when in the stowed position, wherein the third seat portion is configured to support the other shin of the person seated behind the seating unit when the third seat portion is in the deployed position.

29. The seating unit of claim 24, further comprising at least one armrest, wherein the second seat portion is rotatably coupled to the at least one armrest.

30. The seating unit of claim 24, further comprising at least one armrest, wherein the second seat portion is slidably coupled to the at least one armrest.

31. A set of seating units for use in a vehicle, comprising:
   a first seating unit including:
      a first seat portion coupleable to the vehicle, the first seat portion having a first upper surface with a first front extremity and a first rear extremity, the first seat portion being moveable between a first position and a second position, wherein the first seat portion is tilted forwardly downwardly when in the second position;
      a second seat portion having a second upper surface and being moveable between a stowed position and a deployed position, the second seat portion being positioned proximate to the first rear extremity when in the stowed position;
   a second seating unit positionable behind the first seating unit, the second seating unit including:
      a third seat portion coupleable to the vehicle, the third seat portion having a third upper surface with a second front extremity and a second rear extremity, the third seat portion being moveable between a third position and a fourth position, wherein the third seat portion is tilted forwardly downwardly when in the fourth position; and
   wherein the second seat portion is sufficiently spaced apart from the first seat portion so as to be positioned to support and contact at least one shin of a person seated in a kneeling position in the second seating unit when the second seat portion is in the deployed position.

32. The seating units of claim 31 further comprising a backrest positioned at least proximate to the first seat portion.

33. The seating units of claim 31 wherein the second seat portion is sized and configured to support both shins of the person.

34. The seating units of claim 31, further comprising a fourth seat portion spaced apart from the second seat portion and moveable between a deployed position and a stowed position, the fourth seat portion having a fourth upper surface and being positioned proximate to the first rear extremity of the first seat portion when in the stowed position, wherein the fourth seat portion is configured to support the other shin of the person seated in the second seating unit when the fourth seat portion is in the deployed position.

35. A seating unit for use in a vehicle having a floor, comprising:
   a track configured for attachment to the floor;
   a first seat portion coupleable to the floor, the first seat portion having a first upper surface with a front extremity, the first seat portion being moveable between a first position and a second position, wherein the first seat portion is tilted forwardly downwardly when in the second position; and
   a second seat portion coupleable to the track, the second seat portion having a second upper surface configured to support at least one shin of a person, the second seat portion being moveable between a stowed position and a deployed position, wherein the second seat portion is positioned at least partially vertically beneath the first seat portion or another seat portion positioned forward of the first seat portion when the second seat portion is in the stowed position, and wherein the second upper surface is spaced apart from the front extremity of the first seat portion so as to receive a leg between the second upper surface and the front extremity when the second seat portion is in the deployed position.

36. The seating unit of claim 35 wherein at least a portion of the second seat portion is positionable between the first seat portion and the floor when the second seat portion is in the stowed position.

37. The seating unit of claim 35 wherein the second seat portion is spaced apart from the front extremity of the first seat portion by a first distance when the second seat portion is in the deployed position, and the second seat portion is spaced apart from the front extremity of the first seat portion by a second distance greater than the first distance when the second seat portion is in the stowed position.

38. The seating unit of claim 35, further comprising a backrest positioned at least proximate to the first seat portion.

39. The seating unit of claim 35 wherein the second seat portion is sized and configured to support both shins of the person.

40. The seating unit of claim 35 wherein the first seat portion is generally horizontal when in the first position.

41. The seating unit of claim 35 wherein the second seat portion is configured to selectively slide along the track.

42. The seating unit of claim 35, further comprising a support coupleable to the track, wherein the second seat portion is coupled to the support and the support is configured to slide along the track.

43. The seating unit of claim 35, further comprising a support coupleable to the track, wherein the second seat portion is coupled to the support and the support is configured to slide along the track between the stowed position and the deployed position.

44. The seating unit of claim 35, further comprising a support configured to slide along the track, the second seat portion being rotatably coupled to the support, wherein the second seat portion rotates, slides or rotates and slides between the stowed position and the deployed position.

45. The seating unit of claim 35, further comprising a third seat portion having a third upper surface configured to support the other shin of the person, the third seat portion being spaced apart from the second seat portion and moveable between a deployed position and a stowed position, wherein the third upper surface is spaced apart from the front extremity of the first seat portion when the third seat portion is in the deployed position.

46. A seating unit for use in a vehicle, comprising:
   first seat means configured to be coupled to the vehicle and being moveable between a first position and a second position, wherein the first seat means are tilted forwardly downwardly when in the second position; and
   second seat means for supporting at least one shin of a person, the second seat means being moveable between a stowed position and a deployed position, wherein the second seat means are positioned at least partially vertically beneath the first seat means when the second seat means are in the stowed position, and wherein the second seat means are spaced apart from the first seat means when the second seat means are in the deployed position.

47. The seating unit of claim 46 wherein the second seat means are spaced apart from the first seat means so as to receive a leg between the first and second seat means when the second seat means are in the deployed position.

48. The seating unit of claim 46, further comprising a backrest moveable between a reclined position and an upright position.

49. The seating unit of claim 46, wherein the first seat means include a bottom surface and an upper surface, and wherein the second seat means are positioned proximate to the bottom surface of the first seat means when the second seat means are in the stowed position.

50. The seating unit of claim 46 wherein the second seat means are moveable independent of the first seat means.

51. An aircraft comprising:
an interior floor;
a plurality of seating units coupled to the interior floor, at least one of the plurality of seating units including:
a first seat portion coupled to the interior floor, the first seat portion having a first upper surface with a front extremity, the first seat portion being moveable between a first position and a second position, wherein the first seat portion is tilted forwardly downwardly when in the second position; and
a second seat portion having a second upper surface configured to support at least one shin of a person, the second seat portion being moveable between a stowed position and a deployed position, wherein the second seat portion is positioned at least partially vertically beneath the first seat portion or another seat portion positioned forward of the first seat portion when the second seat portion is in the stowed position, and wherein the second upper surface of the second seat portion is spaced apart from the front extremity of the first seat portion so as to receive a leg between the second upper surface and the front extremity when the second seat portion is in the deployed position.

52. The aircraft of claim 51, further comprising a backrest positioned at least proximate to the first seat portion.

53. The aircraft of claim 51 wherein the second seat portion is sized and configured to support both shins of the person.

54. The aircraft of claim 51 wherein the first seat portion includes a bottom surface opposite the first upper surface, and wherein the second seat portion is positioned proximate to the bottom surface when the second seat portion is in the stowed position.

55. A vehicle, comprising:
a floor;
a plurality of seating units coupled to the floor, at least one of the plurality of seating units including:
a first seat portion coupled to the floor, the first seat portion having a first upper surface with a front extremity, wherein the first seat portion is tilted forwardly downwardly; and
a second seat portion having a second upper surface, wherein the second upper surface of the second seat portion is tilted forwardly upwardly and is spaced apart from the first front extremity of the first seat portion so as to receive a leg between the second upper surface and the first front extremity and support a shin with the shin contacting the second upper surface.

56. The vehicle of claim 55 wherein the second seat portion is sized and configured to support both shins of the person.

57. The vehicle of claim 55, further comprising a seat belt coupled to the first seat portion.

58. The vehicle of claim 55 wherein the first seat portion is moveable between a first position and a second position, and wherein the second seat portion is moveable between a stowed position and a deployed position.

59. A seating unit, comprising:
a first seat portion moveable between a first position and a second position, wherein the first seat portion is configured to receive a person in the conventional sitting position with the first seat portion tilted forwardly upwardly when in the first position; and
a second seat portion having a second upper surface configured to support at least one shin of the persons with the shin contacting the second upper surface, the second seat portion being moveable between a stowed position and a deployed position, wherein the second upper surface is spaced apart from the first seat portion when the second seat portion is in the deployed position.

60. The seating unit of claim 59 further comprising a backrest moveable between a reclined position and an upright position.

61. The seating unit of claim 59 wherein the second seat portion is moveable independent of the first seat portion.

62. A seating unit, comprising:
a first seat portion moveable between a first position and a second position, wherein the first seat portion is angled forwardly upwardly when the first seat portion is in the first position, and wherein the first seat portion is angled forwardly downwardly when the first seat portion is in the second position; and
a second seat position moveable between a stowed position and a deployed position, the second seat portion having an upper surface, wherein the second seat portion is spaced apart from the first seat portion and positioned to support at least one shin of a person with the at least one shin contacting the upper surface when the second seat portion is in the deployed position.

63. The seating unit of claim 62 further comprising a backrest moveable between a reclined position and an upright position.

64. The seating unit of claim 62 wherein the second seat portion is moveable independent of the first seat portion.

* * * * *

UNITED STATES PATENT AND TRADEMARK OFFICE
CERTIFICATE OF CORRECTION

PATENT NO. : 6,805,322 B2
DATED : October 19, 2004
INVENTOR(S) : Gregory M. Schmidt It is certified that error appears in the above-identified patent and that said Letters Patent is hereby corrected as shown below:

Column 8,
Line 16, "SO" should be -- so --;

Column 9,
Line 1, delete "A";
Line 28, "feast" should be -- least --;

Column 14,
Line 27, "persons" should be -- person --
Line 49, "seat position" should be -- seat portion --;

Signed and Sealed this

First Day of March, 2005

JON W. DUDAS
*Director of the United States Patent and Trademark Office*